Patented Apr. 4, 1939

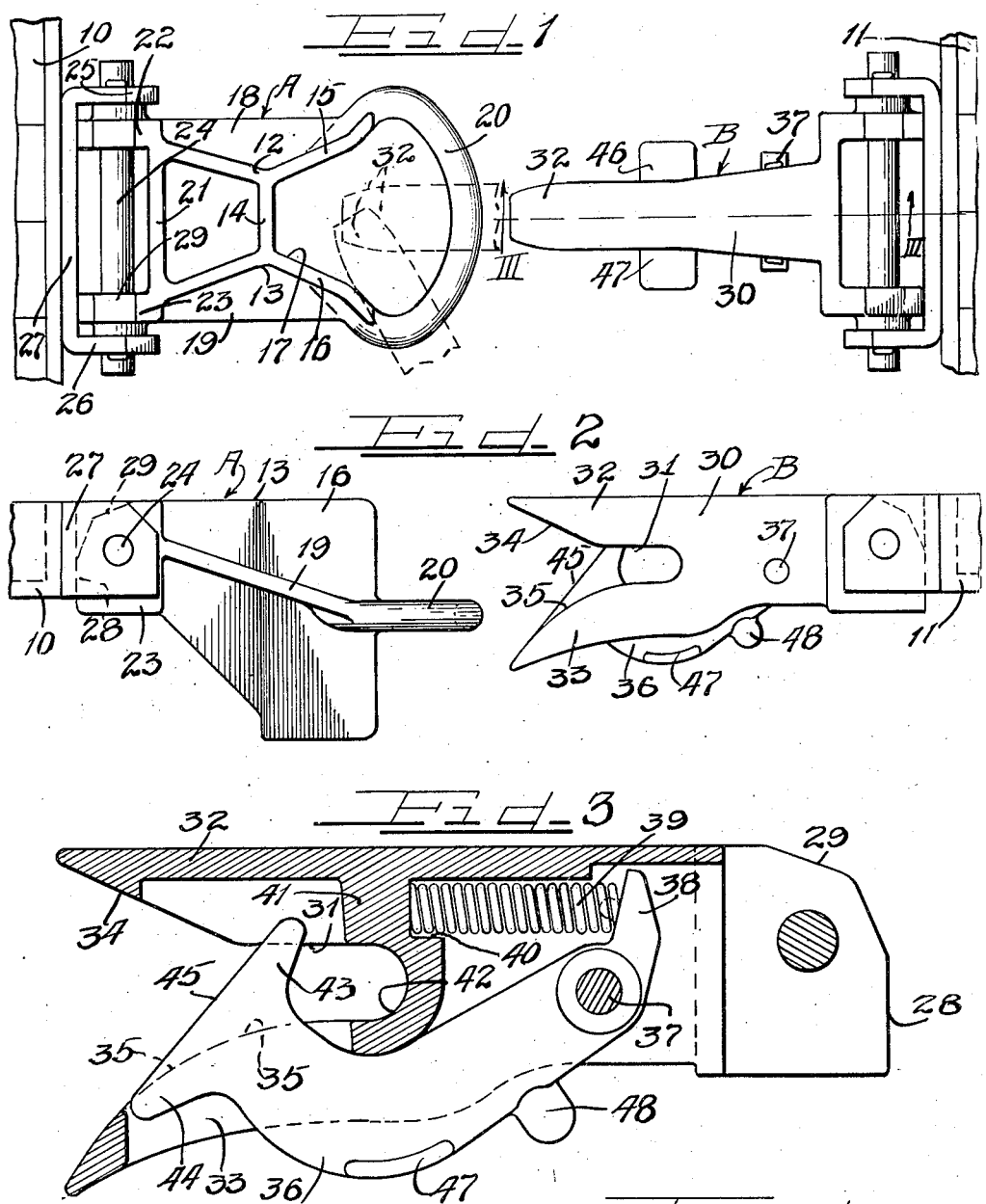

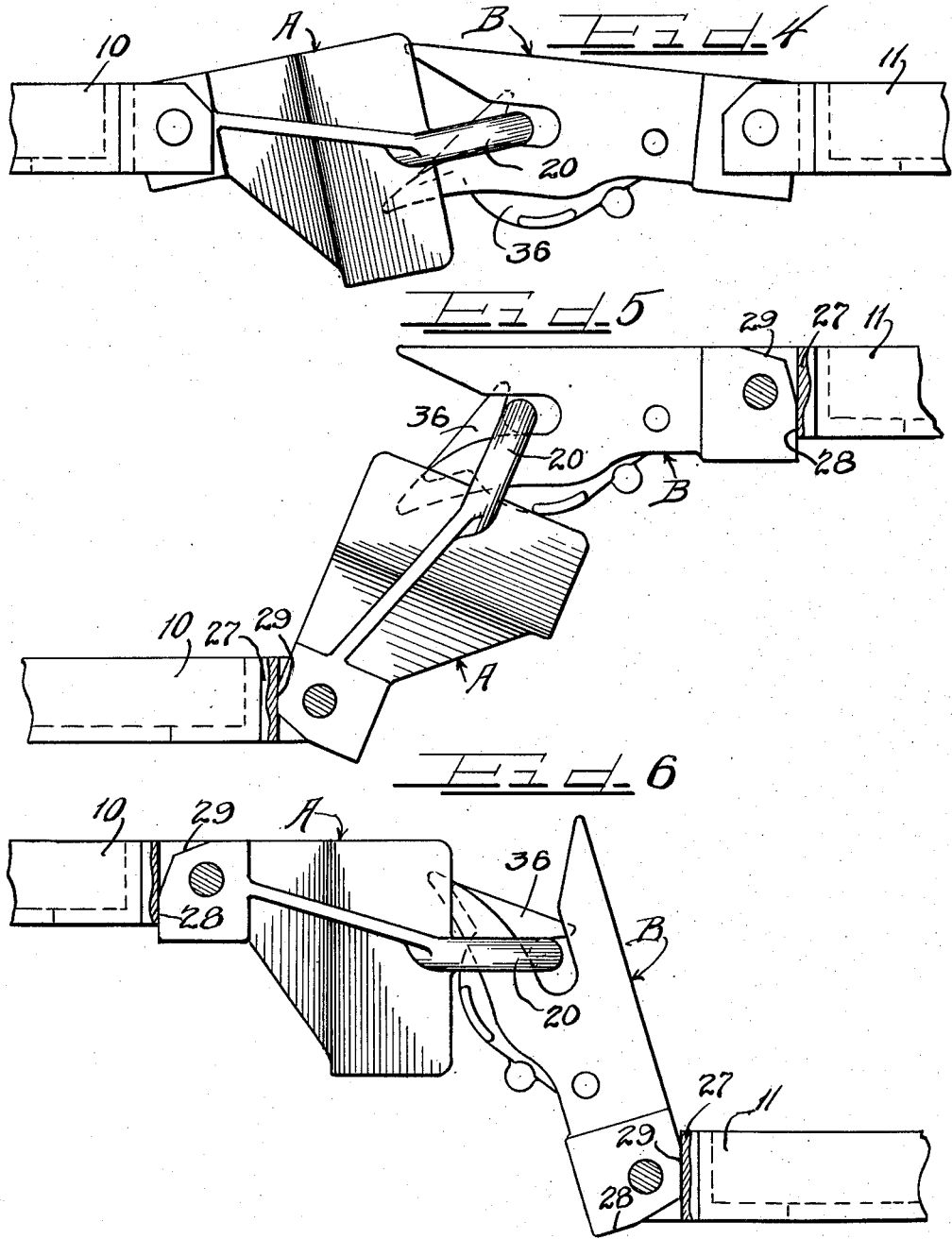

2,153,309

UNITED STATES PATENT OFFICE 2,153,309

VEHICLE COUPLING

Harold E. Milz, Chicago, and Lawrence J. Kline, La Grange, Ill., assignors to The Mercury Manufacturing Company, Chicago, Ill., a corporation of Illinois Application May 21, 1937, Serial No. 143,882

3 Claims. (Cl. 280—33.15)

The present invention relates in general to a vehicle coupling and is more particularly concerned with an improved coupling for connecting a tractor and trailers together to form a "trackless train", so called, for handling materials, etc., about industrial plants, freight houses, piers, steel mills, lumber yards, packing houses, and the like.

In the use of such trains for this purpose, it is highly desirable to be able to operate the trains over an uneven surface, as it is not always possible to have a smooth even surface in the location where the train is to be used.

Under such conditions, these uneven surfaces may abound in sharp grade changes, ridges, and the like, which will cause the coupled ends of the tractor and trailers to be relatively offset in a vertical direction to a considerable extent during the operation of the train. When the usual type of coupling is used, this offsetting of the vehicles may result in damage to the equipment.

It is the present practice in these industrial trains to use couplings which broadly embody a draw bar rigidly mounted on one end of a trailer and a bail pivotally mounted on the associated end of the next trailer, means being provided for latchingly connecting the bail and draw bar. Considerable trouble has been experienced with such couplings on uneven surfaces and in passing over sharp changes in grade, or ridges, etc. One end of a trailer may be raised to such an extent relative to the associated connected end of the next trailer, that extreme abnormal forces may be applied to the coupling parts in a vertical direction and the frame ends of the trailers subjected to torsional forces of sufficient magnitude to damage the trailers. Also, in the case of the tractor, its driving wheels may even be lifted clear of the traction surface, with the result that damaging stresses are transmitted to the following trailer, and the tractor loses its tractive engagement with the surface over which the train is being operated.

It is with an understanding of the foregoing and other difficulties and objections attending the use of the present types of couplings, that the present invention seeks to provide an improved coupling which will permit the respective units of an industrial train to readily accommodate themselves to sharp changes of grade without subjecting the coupling parts and associated framework of the coupled vehicles to abnormal stresses.

It is a further object of the present invention to provide an improved coupling wherein the complementary parts of the coupling are pivoted for vertical swinging movement upwardly from a substantially horizontal position, but are retained from downward movement from such position.

A further object is to provide an improved coupling utilizing pivoted complementary members which may be latchingly secured together at their ends, and in which the position of the latch is slightly raised under pulling forces to a dead center position, but which will automatically drop below the dead center position when the pulling forces are removed, whereby "jack-knifing" of the coupling members is prevented when pushing forces are applied to the coupling.

Another object of the invention is to provide a coupling for connecting vehicles in end to end relation of such construction that the coupling parts will readily accommodate themselves to enable vertical displacement of one vehicle end relative to the associated end of the other vehicle, without subjecting the framework of the vehicles to abnormal stresses.

Still another object is to provide in a coupling of the herein described type improved latching means arranged for manual actuation to unlatched position as by means of the operator's foot, said means being so disposed as not to be interfered with by an overhanging load on the vehicle.

Still another object is to provide in a coupling an improved bumper head of novel construction.

Other objects and features of the invention will more fully appear from the following detailed description, taken in connection with the accompanying drawings, which illustrate a single embodiment thereof, and in which:

Figure 1 is a plan view of the adjacent ends of two vehicles equipped with the coupling of the present invention;

Figure 2 is an elevational view of the same, the coupling parts being in uncoupled relationship;

Figure 3 is an enlarged longitudinal sectional view taken through one of the coupling members to show the details of the latching mechanism, taken substantially on line III—III of Figure 1;

Figure 4 is a view diagrammatically illustrating the positions of the component parts of the coupling under pulling conditions;

Figure 5 is a similar view showing the positions of the coupling parts when the interconnected ends of the vehicles are vertically offset in one direction; and Figure 6 is a similar view showing the positions of the coupling parts when the vehicle ends are vertically offset in the opposite directions.

As shown on the drawings:

In the illustrated embodiment of the invention there is disclosed in Figure 1 the ends of vehicles 10 and 11 which are to be connected in end to end relationship. These ends are respectively provided with complementary draw bars generally indicated at A and B respectively.

Draw bar A comprises a pair of vertically disposed spaced wall members 12 and 13, these members being interconnected intermediate their ends by a bridging wall portion 14. These wall portions diverge outwardly from the bridging portion 14 to form guiding lateral wing portions 15 and 16 at the outermost end of the draw bar.

The bridging portion 14 and wing portions 15 and 16 cooperate to define a vertically extending groove 17 and form the bumper head end of the draw bar. For strengthening the wall portions, the walls are respectively provided with ribs 18 and 19 on their outer surfaces. These ribs at their outermost ends, adjacent the outermost edges of the wing portions 15 and 16, are extended to form a bail member 20 which extends outwardly from the forward edges of the wing portions and is at right angles thereto.

Integrally formed with the innermost ends of the wall portions 12 and 13 is a bridging portion 21 which terminates at its ends in deflected lugs 22 and 23, which are provided with suitable aligned apertures for receiving therethrough a pivot pin 24. The ends of the pivot pin are supported in aligned lugs 25 and 26 at the ends of a supporting bracket 27, this bracket being secured in any suitable manner to the end framework of a vehicle 10.

As clearly shown in Figure 2, the lugs 22 and 23 are so arranged that their rear edges 28 will abut the forward surface of the bracket 27 to normally maintain the bail 20 in a horizontal position below a horizontal plane through the pivot pin 24.

These lugs are also provided with an angularly disposed abutment edge 29 which abuts the forward surface of the bracket 27 when the draw bar is pivoted in an upward direction from normal position a predetermined amount.

The complementary draw bar B is provided with similar lugs at its innermost end and is pivoted in like manner to vehicle 11, so that the draw bar is normally held in a substantially horizontal position, but may be pivotally swung in an upward direction.

Draw bar B comprises a hollow arm 30 which is pivoted at its innermost end, as just described, and at its outermost end forms a head portion having an inwardly extending slot 31 defining vertically spaced jaws 32 and 33. These jaws are respectively provided with relatively divergent guiding surfaces 34 and 35, the latter surface being curved.

From the relative normal positions of the complementary draw bars A and B, as shown in Figure 2, it will be observed that the bail 20 is so disposed that it will not pass directly into the bottom portion of the slot 31, when the draw bar ends are moved into abutting relation, but will strike on the curved surface 35 and be lifted as it rides over this surface into the slot 31. As the draw bars are moved into abutting relation, the ends of the jaws 32 and 33 will be guided by wing portions 15 and 16 into the vertical groove 17 of the abutment head of the draw bar A.

As shown in Figure 3, the draw bar B is hollowed out to receive therein a hook-shaped latching member 36 which is mounted for pivotal swinging movement on a pivot pin 37 at the innermost end of the shank of the hook. This end of the hook is also provided with a substantially oppositely extending arm 38 against which one end of a compression spring 39 abuts, the other end of this spring being retained in a socket 40 in an integrally formed projection 41.

The projection 41 extends downwardly from the top of the draw bar into the hollow portion thereof and at its lowermost end forms an abutment for the hook 36, whereby the upward swinging movement of the hook under the influence of compression spring 39 is limited. The hook, however, may be swung in the opposite direction against the pressure of spring 39. The projection 41 is recessed on its side facing the slot 31 and is provided with a round bottom groove 42 which defines an abutment surface for limiting the inward movement of the bail 20 into slot 31.

It will be observed, as shown in Figure 3, that the free end of hook 36 is formed with oppositely extending deflected portions 43 and 44, and that the end surface 45 of the hook forms an inclined plane relative to the curved surface 35 of the lower jaw. Moreover, as the bail 20 rides into the slot 31 on surface 35, contact of the bail with the inclined surface 45 of the hook will cause the hook to move downwardly so that the deflected portion 43 is drawn from a position extending across the slot 31, thereby enabling the bail to pass into slot 31 and abut the bottom of groove 42. In this position of the bail, the hook portion 43 is released, whereupon the spring 39 forces the hook back to normal position against the lower end of projection 41, thus latchingly securing the bail 20 against removal from the head of draw bar B.

For moving the hook to unlocked position, the hook is provided with oppositely extending wing portions 46 and 47 which normally project outwardly below the jaw 33. The wing portions 46 and 47 are so arranged that an operator, by placing his foot on one of the wing portions and pressing downwardly, may easily move the latching hook to unlatched position, when it is desired to uncouple the draw bars A and B. It will be apparent that by placing the wing portions 46 and 47 below draw bar B, these wing portions will at all times be readily accessible, and any overhanging load on the associated vehicle will not interfere with the uncoupling or unlocking operation.

As clearly shown in Figure 3, the underside of the hook 36 is provided with a projecting lug 48 which is arranged to have a remotely located release lever connected thereto through a suitable link connection.

Referring to Figure 4, the relative positions of the complementary draw bars A and B are shown, when a pulling force is exerted on the coupling. In this view, the vehicles 10 and 11 are being supported on a level surface so that the respective pivots of the draw bars will be disposed the same distance above the surface on which the vehicles are being operated. Under these conditions, it will be observed that the pivotal connection between the latched ends of the draw bars will be slightly raised, the draw bars being pivotally swung in an upward direction, until the center line of the engaged portion of the bail is in a plane including the center lines of the draw bar pivots. If the pulling forces are removed and pushing forces are applied to the coupling, then as the pulling forces are slackened off the draw bars will drop to their normal positions and carry the center line of the engaged bail to a lower point. Thus, when the pushing forces are applied, "jack-knifing" of the draw bars in an upward direction will be obviated.

As shown in Figure 5, if the connected vehicles are being operated over an uneven surface so that vehicle 11 will be raised relative to vehicle 10, then draw bar B will remain in its normal position with the abutment edges 28 of the supporting lugs in engagement with the forward surface of bracket 27. On the other hand, draw bar A will pivot upwardly as shown, the amount of this pivotal movement depending upon the relative displacement between the vehicles. The maximum displacement between the vehicles will be when the abutting edge 29 engages the forward surface of bracket 27.

In Figure 6, the relative positions of draw bars A and B are shown, when the vehicles 10 and 11 are offset vertically in the opposite direction, that is, vehicle 10 being disposed above vehicle 11. Under these conditions, the draw bar A will remain in its normal position, whereas draw bar B will pivot upwardly until its abutment edge 29 engages the forward surface on bracket 27 when the maximum displacement occurs between vehicles 10 and 11.

From a study of the action of the draw bars, when the vehicles associated therewith are vertically displaced relative to each other, it will be readily apparent that if it were not for the pivotal action of these draw bars, excessive stresses would be applied to the frame structures of the vehicles, and under certain conditions, the wheels of a vehicle might even be lifted so that the weight of materials on the vehicle set up abnormal forces in the vehicle frame, with the result that damage might result thereto.

From the foregoing description, it will be apparent that the present invention provides an improved coupling which will permit coupled vehicles to operate on an uneven surface containing sharp changes in grade without subjecting the couplings and associated frame works of the vehicles to abnormal stresses; a coupling in which the draw bars are both pivoted for vertical swinging movement in an upward direction from a substantially horizontal position, but are retained from downward movement from such position; which embodies pivotally mounted draw bars which may be pivotally latched together, the latching pivot being so arranged that normally it is below a dead center position, but which will upon the application of a pulling force raise to the dead center position and again assume the position below dead center when the pulling forces are removed, thus preventing "jack-knifing" when pushing forces are applied to the coupling; which includes improved latching means that may be manually actuated and that will not be interfered with by an overhanging load on the vehicle; and in which one of the draw bars is provided with an improved bumper head construction.

Now, it is, of course, to be understood that although we have described in detail a single embodiment of our invention, the invention is not to be thus limited, but only insofar as defined by the scope and spirit of the appended claims.

We claim as our invention:

1. A coupling for connecting two vehicles in end-to-end relation, said coupling comprising a latch on one vehicle and pivoted thereto and having an inclined end, a link on another vehicle and pivoted thereto and having an end provided with an arcuate opening, supporting means for said link to hold it normally in a position below a plane passing through the centers of the pivotal connections of the link and the latch members to their respective vehicles but allowing said link to swing upwardly, supporting means for said latch to hold it normally in a projecting position below said plane but allowing said latch to swing upwardly, said link being adapted to slide up on said inclined end for engagement by said latch in any substantial radial position within the arc of the opening in the end of said link, when these parts are brought together.

2. A coupling for connecting two vehicles in end-to-end relation, said coupling comprising a latch pivoted on one vehicle and having an inclined end, a link pivoted on another vehicle and having an end provided with an arcuate opening, supporting means for said link to hold it normally in a position below a plane passing through the centers of the pivotal connections of the link and the latch members to their respective vehicles but allowing said link to swing upwardly, supporting means for said latch to hold the latch and inclined end normally in a projecting position below said plane but allowing them to swing upwardly as a unit, said link being adapted to slide up on said inclined end to approach but not pass above said plane and be engaged by the latch in any substantial radial position within the arc of the opening in the end of the link, when these parts are brought together.

3. A coupling for connecting two vehicles in end-to-end relation, said coupling comprising a draw-bar on each vehicle and pivotally connected thereto, respectively, and cooperable latching means carried by said bars and at the free ends thereof and supported disposed normally positioned below a plane passing through the centers of said pivotal connections of said bars, said latching means being arranged to so coact when the bars are brought into end-to-end relation for coupling as to impose forces on said bars tending to swing said bars in a downward direction only.

HAROLD E. MILZ.
LAWRENCE J. KLINE.